(12) United States Patent
Yedur et al.

(10) Patent No.: US 6,455,847 B1
(45) Date of Patent: Sep. 24, 2002

(54) CARBON NANOTUBE PROBES IN ATOMIC FORCE MICROSCOPE TO DETECT PARTIALLY OPEN/CLOSED CONTACTS

(75) Inventors: Sanjay K. Yedur, Santa Clara, CA (US); Bhanwar Singh, Morgan Hill, CA (US); Bryan K. Choo, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/558,198

(22) Filed: Apr. 26, 2000

(51) Int. Cl.$^7$ .................................................. G01B 5/28
(52) U.S. Cl. ..................... 250/306; 250/307; 438/14; 423/447.2; 204/157.47; 73/105
(58) Field of Search ................................ 250/306, 307; 438/14; 423/447.2; 204/157.47; 73/105

(56) References Cited

U.S. PATENT DOCUMENTS

| | | | |
|---|---|---|---|
| 5,201,992 A | 4/1993 | Marcus et al. ............... 156/643 |
| 5,346,683 A | 9/1994 | Green et al. ............. 423/447.2 |
| 5,393,647 A | 2/1995 | Neukermans et al. ....... 430/320 |
| 5,424,054 A | 6/1995 | Bethune et al. .......... 423/447.2 |
| 5,457,343 A | 10/1995 | Ajayan et al. ............... 257/734 |
| 5,611,942 A | 3/1997 | Mitsui et al. .................. 216/67 |
| 5,747,120 A | 5/1998 | McLean, II et al. ........ 427/596 |
| 5,824,470 A * | 10/1998 | Baldeschwieder et al. ..... 435/6 |
| 5,866,434 A | 2/1999 | Massey et al. ............... 436/526 |
| 5,877,412 A | 3/1999 | Muramatsu et al. .......... 73/105 |
| 5,916,642 A | 6/1999 | Chang ......................... 427/580 |
| 6,354,133 B1 * | 3/2002 | Yedur et al. .................. 73/1.79 |

OTHER PUBLICATIONS

"Scanning Tunneling Microscope Update 1997", taken from the Internet at http://www.umsl.edu/~fraundor/stm97x.html, Oct. 21, 1999, 5 pages.

"Carbon Nanotubes and Related Structures", A carbon nanotube page, taken from the Internet at http://www.rdg.ac.uk/~scsharip/tubes.htm, Apr. 17, 2000, 6 pages.

"What is an Atomic Force Microscope?", taken from the Internet at http://www.che.utoledo.edu/nadarajah/webpages/whatsafm.html, Oct. 20, 1999, 2 pages.

"The Atomic Force Microscope (AFM)", taken from the Internet at http://www.sst.ph.ic.ac.uk/photonics/intro/AFM.html, Oct. 20, 1999, 2 pages.

* cited by examiner

*Primary Examiner*—Bruce Anderson
*Assistant Examiner*—Nikita Wells
(74) *Attorney, Agent, or Firm*—Eschweiler & Associates, LLC (57) ABSTRACT

The present invention relates to a system for measuring a linewidth or profile of a feature and comprises a scanning probe microscope having a nanotube scanning tip. The nature of the nanotube scanning tip provides high resolution and accurate measurements which is generally independent of a wearing thereof. The present invention also relates to a method of measuring a linewidth of profile of a feature and comprises the steps of scanning a portion of the feature on the substrate with a scanning probe microscope comprising a nanotube scanning tip and detecting a characteristic associated with the nanotube scanning tip. The method also comprises determining a characteristic associated with the portion of the feature on the substrate based on the detected nanotube scanning tip characteristic. Lastly, the present invention relates to a method of detecting a partially open contact hole and comprises scanning a region containing the contact hole with a scanning probe microscope comprising a nanotube scanning tip. The method further comprises generating topography data associated with the scanning step and determining whether the contact hole is fully open using the topography data.

21 Claims, 11 Drawing Sheets

Fig. 1a

(PRIOR ART)

Fig. 1b

(PRIOR ART)

Fig. 1c

(PRIOR ART)

Fig. 1d

(PRIOR ART)

CARBON NANOTUBE PROBES IN ATOMIC FORCE MICROSCOPE TO DETECT PARTIALLY OPEN/CLOSED CONTACTS

TECHNICAL FIELD

The present invention generally relates to scanning probe microscopy, and in particular to a system and method for detecting partially open/closed contacts using a scanning probe microscope employing a nanotube as a scanning tip.

BACKGROUND OF THE INVENTION

In the semiconductor industry, there is a continuing trend toward higher device densities. To achieve these high densities there has been and continues to be efforts toward scaling down the device dimensions (e.g., at submicron levels) on semiconductor wafers. In order to accomplish such high device packing density, smaller and smaller features sizes are required. This may include the width and spacing of interconnecting lines, spacing and diameter of contact holes, and the surface geometry such as corners and edges of various features.

The requirement of small features with close spacing between adjacent features requires high resolution photolithographic processes. In general, lithography refers to processes for pattern transfer between various media. It is a technique used for integrated circuit fabrication in which a silicon slice, the wafer, is coated uniformly with a radiation-sensitive film, the resist, and an exposing source (such as optical light, x-rays, etc.) illuminates selected areas of the surface through an intervening master template, the mask, for a particular pattern. The lithographic coating is generally a radiation-sensitive coating suitable for receiving a projected image of the subject pattern. Once the image is projected, it is indelibly formed in the coating. The projected image may be either a negative or a positive image of the subject pattern. Exposure of the coating through a photomask causes the image area to become either more or less soluble (depending on the coating) in a particular solvent developer. The more soluble areas are removed in the developing process to leave the pattern image in the coating as less soluble polymer.

Due to the extremely fine pattern dimensions employed in present day integrated circuits, techniques are being generated to help accurately measure such dimensions. One generic class of tools employed for such high accuracy measurements is the scanning probe microscope (SPM). Generally, scanning probe microscopy provide pictures of atoms on or in surfaces, thereby providing atomic level surface imaging. One form of a Scanning Probe Microscope is an Atomic Force Microscope (AFM), which is sometimes alternatively referred to as a Scanning Force Microscope (SFM). AFMs include a sensor with a spring-like cantilever rigidly mounted at one end and having a scanning tip at a free end. AFMs may operate in contacting and non-contacting modes. In the contacting mode, the tip of an AFM is placed in low force contact with a surface of a semiconductor wafer or other workpiece of interest. The workpiece is then displaced relative to the AFM in one or more directions in a plane (e.g., the tip contacts the workpiece in a Z axis while the workpiece is displaced in the X and/or Y directions), to effect a scanning of the workpiece surface. As surface contours or other topographic features are encountered by the tip during scanning, the cantilever deflects. The cantilever deflection is then measured, whereby the topography of the workpiece may be determined.

In non-contacting operation, the tip is held a short distance, typically 5 to 500 Angstroms, from the workpiece surface, and is deflected during scanning by various forces between the workpiece and the tip. Such forces may include magnetic, electrostatic, and van der Waals forces. In both the contacting and non-contacting modes, measurements of a workpiece topography or other characteristic features are obtained through measuring the deflection of the cantilever. Deflection of the cantilever may be measured using precisely aligned optical components coupled to deflection measurement circuitry, although other techniques are sometimes employed.

Another form of SPM is a Scanning Tunneling Microscope (STM). Where a feature of interest is non-topographic, AFMs as well as STMs may be utilized used to measure the workpiece feature. Examples of non-topographic features include the detection of variations in conductivity of a semiconductor workpiece material. An AFM can be used to scan a workpiece in the non-contacting mode during which deflections in the cantilever are caused by variations in the workpiece conductivity or other property of interest. The deflections can be measured to provide a measurement of the feature. STMs include a conductive scanning tip which is held in close proximity (within approximately 5 Angstroms) to the workpiece. At this distance, the probability density function of electrons on the tip spatially overlap the probability density function of atoms on the workpiece. Consequently, a tunneling current flows between the workpiece surface and the tip if a suitable bias voltage is applied between the tip and the workpiece. The workpiece and tip are relatively displaced horizontally (in the X and/or Y directions) while the tip is held a constant vertical distance from the workpiece surface. The variations in the current can be measured to determine the changes in the workpiece surface.

In another mode of operation, an STM can be used to measure topography. The scanner moves the tip up and down while scanning in the X and/or Y directions and sensing the tunneling current. The STM attempts to maintain the distance between the tip and the surface constant (through moving the tip vertically in response to measured current fluctuations). The movements of the tip up and down can be correlated to the surface topography profile of a workpiece.

In both types of SPMs, the dimensions of the scanning tip is important. It is desirable for high resolution imaging that the tip be sharp and hard. A hard tip will not wear quickly and thus will provide high resolution imaging for a longer period of time before needing to be replaced. Because scanning tips are expensive, such a tip characteristic is desirable. Nevertheless, hard tips will still wear over a period of time, which will result in reduced imaging accuracy by the SPM.

It is therefore desirable to have a system and/or method of utilizing an SPM which provides high resolution imaging/measuring capabilities.

SUMMARY OF THE INVENTION

The present invention relates to a system and method of analyzing a feature such as performing linewidth measurements, performing profile analysis, and analyzing contact holes using a scanning probe microscope (SPM) having a nanotube scanning tip.

According to the present invention, an SPM employs a nanotube scanning tip such as a carbon nanotube. The nanotube scanning tip provides a substantial improvement over conventional scanning tips. The nanotube scanning tip has a length and a cross sectional area associated therewith.

The cross sectional area of at least a portion of the nanotube tip's length is generally constant, and thus the scanning resolution provided by the tip is generally constant as the nanotube scanning tip experiences wear, which represents a significant improvement over conventional solutions.

According to one aspect of the present invention, a system for analyzing a film or feature on a substrate (e.g., performing linewidth or profile measurements or analyzing topography) comprises an SPM such as an AFM or an STM which includes a scanning tip assembly. The scanning tip assembly also includes a nanotube scanning tip such as a carbon nanotube. The system further comprises a controller which is operably coupled to the SPM and provides control signals to the SPM to control one or more scanning characteristics associated with the scanning assembly. The controller also receives scanning signals from the SPM associated with the detected tip characteristics associated with the film or feature on the substrate, and provides scanning output data to a user in a format that is capable of analysis by a user. The scanning tip assembly having the nanotube scanning tip provides relatively constant scanning resolution as the scanning tip experiences wear, thereby greatly reducing the cost of scanning tips by reducing a frequency at which such tips must be replaced.

According to another aspect of the invention, a method for measuring a linewidth or a feature profile is disclosed. The method comprises scanning a region containing at least a portion of the feature or profile of interest with an SPM which employs a nanotube scanning tip such as a carbon nanotube. The nanotube scanning tip is employed to detect a characteristic associated with the portion of the feature or profile. A characteristic associated with the portion of the feature or profile, for example, a topography, is identified by detecting a characteristic associated with the nanotube scanning tip, for example, by detecting a deflection or a tunneling current associated therewith. Using the method of the present invention, scanning resolution is substantially improved due to the shape and dimensions of the nanotube scanning tip.

According to another aspect of the present invention, a method of detecting a partially open/closed contact hole comprises scanning a region containing the contact hole with an SPM which employs a nanotube scanning tip. Using the SPM having the nanotube scanning tip, topography data related to the contact hole is generated and used to determine a state of the contact hole. More particularly, for example, the topography data is used to determine whether or not the contact hole is partially or wholly open. Using the SPM with the nanotube scanning tip, topography data is collected throughout substantially the entire portion of the contact hole, thereby providing a substantial improvement in contact hole analysis over conventional methodologies.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference numerals are used to refer to like elements throughout. The present invention generally relates to a system and method of analyzing a film or a feature on a substrate using a scanning microscope system. The present invention provides significant advantages over conventional systems by employing a nanotube scanning tip such as a carbon nanotube. Use of a nanotube scanning tip is advantageous because the nanotube tip has a cross sectional area which is generally constant along at least a portion of its length, and thus the scanning resolution remains relatively constant as the scanning tip experiences wear, thereby improving the usable life of the scanning tip and reducing the cost associated therewith.

According to one aspect of the present invention, a system and method of measuring linewidths, analyzing feature profiles and determining whether a contact hole is partially closed is provided. The method utilizes a nanotube scanning tip such as a carbon nanotube to scan the feature or contact hole and gather topographical data associated therewith. Since the nanotube scanning tip has a diameter or cross sectional area that is generally constant along at least a portion of its length, highly accurate, precise measurements are obtained at all points about the feature or contact hole, respectively.

Figure 1A:
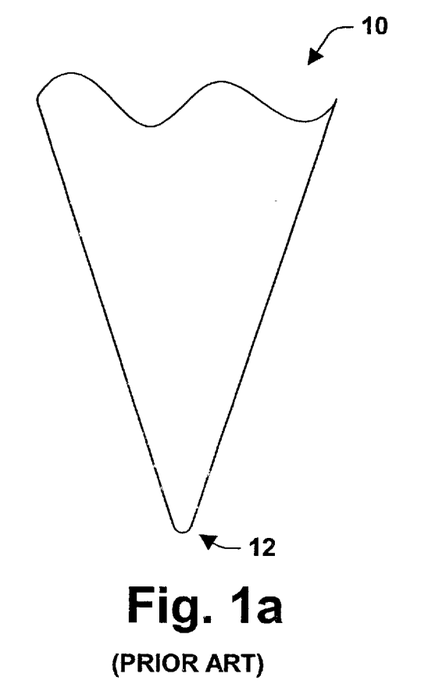
FIGS. 1a–1g are fragmentary cross section diagrams illustrating conventional conical and boot type scanning tips exhibiting varying degrees of tip sharpness due to tip wear which are employed in scanning probe microscope systems.
Figure 1B:
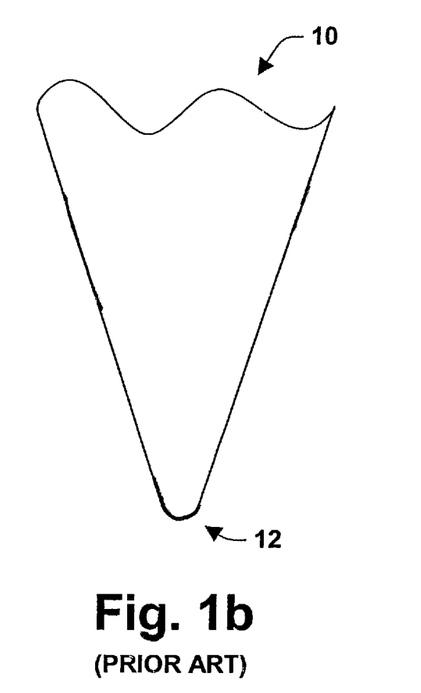
Figure 1C:
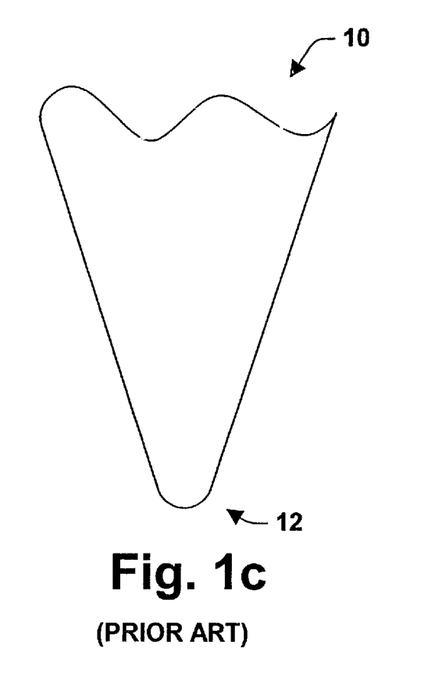
Figure 1D:
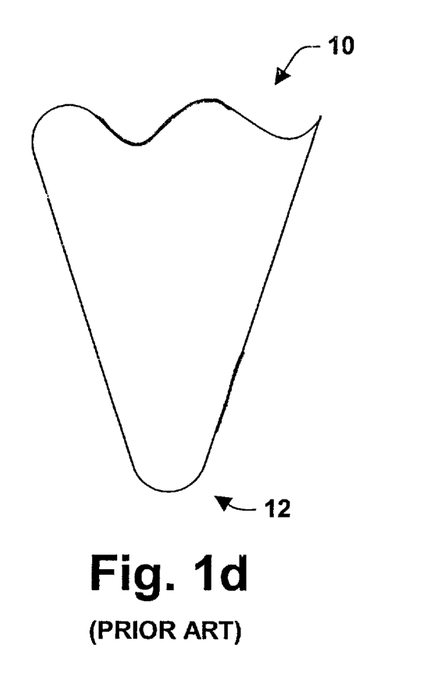

SPMs, both AFMs and STMs, typically employ sharp scanning tips to scan various types of films or features of interest. For example, FIG. 1a is a fragmentary cross section of a prior art conical scanning tip 10 having a contact end 12 which may exhibit a radius of curvature of as little as 50 Angstroms, but due to polymerization is typically about 150–200 Angstroms in practice. Although such a sharp tip end 12 provides good scanning resolution for an SPM system, the tip end 12 experiences wear as it is used, particularly in contact-mode or tapping-mode type applications. Such wear progressively alters, and, in fact, degrades the sharpness of the tip end 12, as illustrated in prior art FIGS. 1b–1d, respectively. For example, in FIG. 1b, the tip end 12 exhibits only preliminary wear, however, such preliminary wear results in an increase in the radius of curvature thereof. Similarly, as illustrated in FIGS. 1c and 1d, as wear progresses, the radius of curvature further increases until, at some point, the scanning tip 10 is not sufficiently sharp to continue scanning at the desired scanning resolution level. For example, as the tip experiences substantial wear as in FIG. 1d, sensitivity may decrease to such an extent that the tip 10 cannot distinguish between distinct points for a given resolution level. In such circumstances, the scanning tip, which is relatively expensive, must be replaced. Due to the rather quick rate of wear in such scanning tips 10, the rate of replacement is rather high, resulting in a large cost to operate SPM type systems which employ such scanning tips.

In addition to the above limitations of prior art scanning tips, even in circumstances where prior art scanning tips such as the tips 10 of FIGS. 1a–1d are sufficiently sharp to continue their use, the change in tip sharpness at the tip end 12 results in variations in scanning accuracy. Although the tips are quite sharp, their dimension is typically taken into account during scanning to provide for an accurate analysis. Therefore different types of tips typically have different correction or "fudge" factors associated therewith to account for their finite size. As illustrated in FIGS. 1a–1d, however, conventional scanning tips 10 have dimensions that vary over time; consequently, the correction factors employed to take into account their dimension will not accurately reflect the tip dimension throughout the entire life of the scanning tip. That is, if the correction factor is $\Delta T$ for a tip curvature of 200 Angstroms, as the tip sharpness decreases (e.g., to about 400 Angstroms), the correction factor $\Delta T$ will not accurately reflect the dimensional change in the tip, thus resulting in a scanning accuracy that varies disadvantageously over time.

Figure 1E:
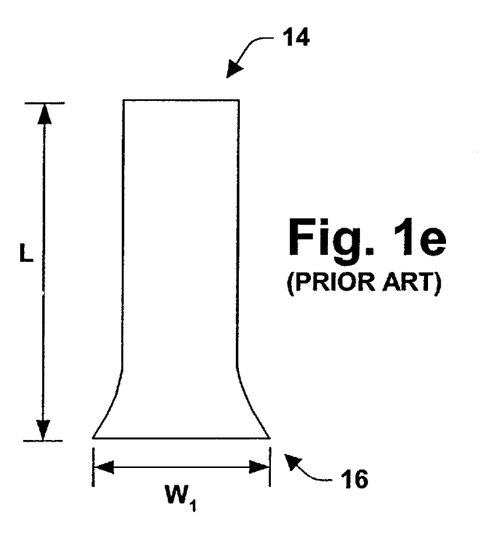
Figure 1F:
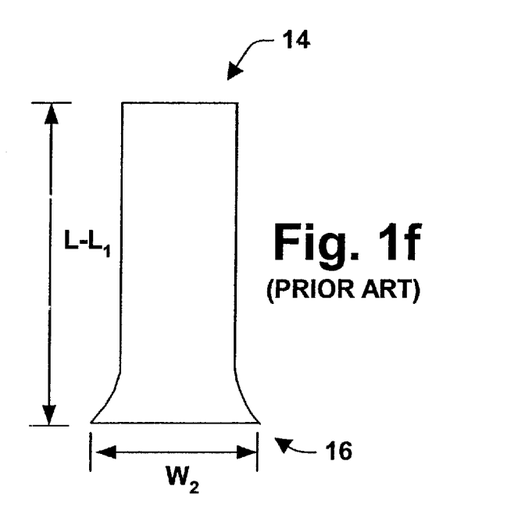
Figure 1G:
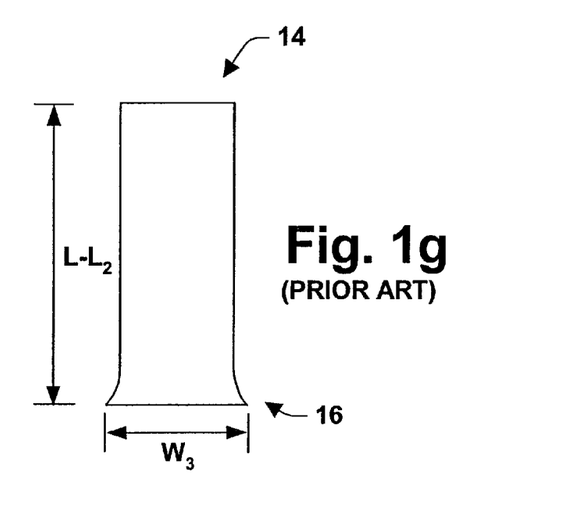

The above disadvantageous characteristic also exists in other types of prior art scanning tips, such as the boot tip 14 of FIGS. 1e–1g. The boot tip 14 has a flared end 16 having a width dimension (e.g., $W_1$) at an initial length L (wherein L represents the length of the scanning tip prior to experiencing any wear). As the boot tip 14 experiences wear, its length decreases (e.g., $L-L_1$, as illustrated in FIG. 1f). In addition, the dimension of the flared tip 16 that interfaces with the film or substrate of interest changes, for example, to $W_2$, wherein $W_2<W_1$. Therefore, as the boot tip 14 experiences wear, the dimension of the tip interface constantly changes (see, e.g., FIGS. 1f and 1g). Therefore the correction factor associated with the boot tip 14 does not provide adequate compensation as the tip experiences wear.

Another disadvantage associated with both conventional conical and boot scanning tips is their dimensional variation tip-to-tip. That is, each of the conventional scanning tips vary significantly dimensionally from one tip to another due to the manufacturing methodologies utilized to produce such tips. Consequently, each time a scanning tip is replaced with a new tip, a calibration of the tip is necessary in order to ascertain the appropriate tip correction factor associated therewith. Such a calibration is burdensome, since it requires extra time each instance in which a scanning tip is replaced.

Figure 2A:
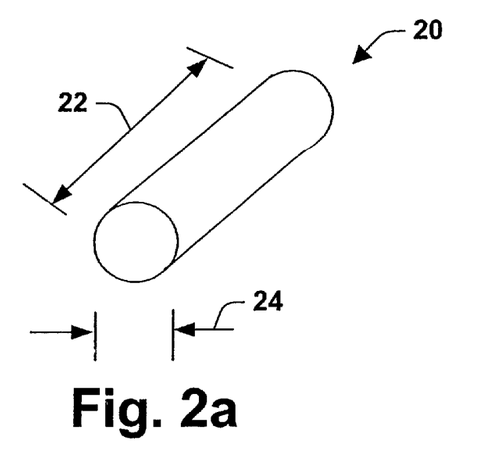
FIG. 2a is a perspective view illustrating an exemplary nanotube according to the present invention.

The scanning tip of the present invention differs from conventional scanning tips and overcomes several of the disadvantages associated therewith. Turning to FIG. 2a, a perspective view of a nanotube scanning tip 20 according to the present invention is illustrated. The nanotube scanning tip 20 has a length 22 and a cross sectional area 24, respectively. Typically, nanotubes have a generally circular shaped cross sectional area, however, other shaped tubes may be employed and are contemplated as falling within the scope of the present invention. According to one aspect of the present invention, the nanotube 20 exhibits a cross sectional area 24 that is relatively constant along at least a portion of its length 22. Consequently, the sharpness of the tip, defined generally by the cross section area 24 of the nanotube 20 contacting or nearly contacting the film or feature of interest, is generally constant despite the nanotube scanning tip experiencing wear.

Figure 2B:
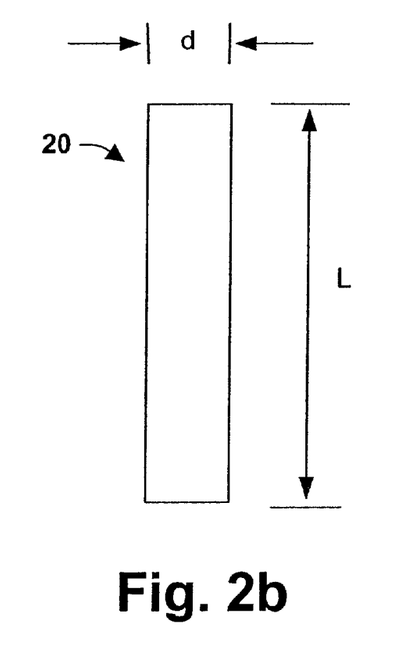
FIGS. 2b–2d are cross section diagrams illustrating exemplary nanotubes exhibiting varying degrees of wear according to the present invention.
Figure 2C:
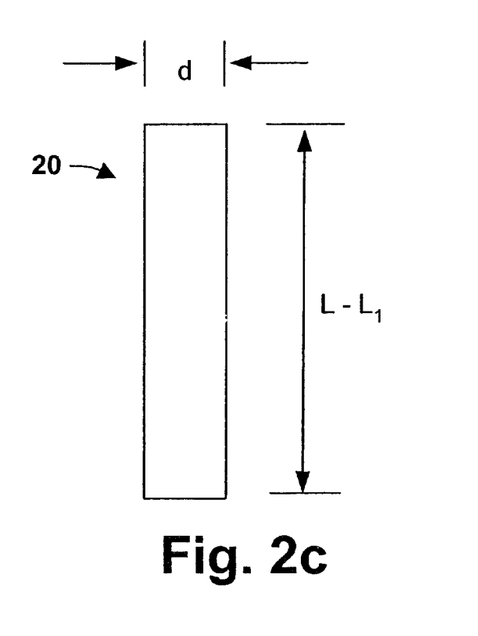
Figure 2D:
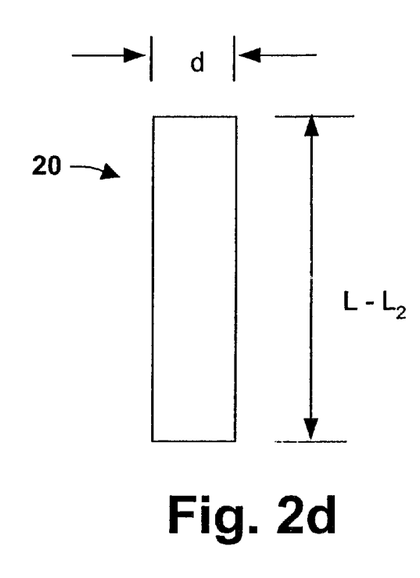

The above advantageous feature of an exemplary nanotube scanning tip 20 is illustrated in FIGS. 2b–2d, respectively. In FIG. 2b, the nanotube scanning tip 20 has a length L and a diameter d (note that if the nanotube scanning tip 20 employs a different cross sectional shape as opposed to a cylinder, the tip 20 may alternatively be characterized by a length L and a cross sectional area A). The tip 20 of FIG. 2b represents the nanotube tip sharpness at the beginning of use, wherein substantially the entire tip exists (no wear), and the scanning resolution provided by the tip 20 is a function of the diameter d (or alternatively the cross sectional area). As the scanning tip 20 is used, it experiences wear, as illustrated in FIGS. 2c and 2d, respectively.

As seen in the figures, tip wear results in a decrease in the length of the nanotube scanning tip (e.g., $L-L_1$, and $L-L_2$, respectively). Although tip wear does occur, the scanning resolution provided by the tip 20 is a function of the diameter d of the portion of the tip contacting or near the film or feature of interest. Because the nanotube scanning tip dimension (in this example, d) is generally constant along at least a portion of its length L, the scanning resolution is generally constant, independent of tip wear. Consequently the nanotube scanning tip 20 of the present invention does not need to be replaced as often as conventional tips. In addition, the generally constant tip sharpness characterized by the diameter, or alternatively the cross sectional area, independent of nanotube scanning tip wear eliminates the problems associated with the finite scanning tip size correction factors of the prior art described supra.

In addition to providing for a generally constant diameter or cross sectional area (e.g., about 1–50 nm) that is independent of tip wear, nanotubes exhibit a high degree of dimensional uniformity within a given batch. That is, variation in diameter or cross sectional area from nanotube-tonanotube is extremely small, on the order of several Angstroms (e.g., about 1–20 Angstroms), and thus even when a nanotube scanning tip requires replacement, no additional calibration is necessary because the correction factor used for one nanotube scanning tip of a given material (e.g., carbon) can be used as the correction factor for the replacement tip. Therefore not only do nanotube scanning tips get replaced substantially less frequently than conventional scanning tips, but when the nanotube tip is replaced, the replacement procedure is substantially less burdensome because tip replacement does not require re-calibration.

Yet another advantageous feature of nanotube scanning tips, particularly carbon nanotube scanning tips, is the flexibility of the tip. Because the tip is flexible, the scanning tip is substantially less susceptible to breakage. Whereas conventional scanning tips are more rigid and consequently more prone to break when under stress, nanotube tips such as carbon nanotube tips bend when under stress and are substantially resilient, thus moving back to their original position and shape after a stress is removed therefrom. Therefore for this additional reason nanotube scanning tips provide improved performance and reliability over conventional scanning tips.

As discussed above, the tip 20 of the scanning probe microscope system includes a nanotube. According to one aspect of the present invention, the nanotube scanning tip 20 is composed of carbon, however metallic or semiconductor type nanotubes may be utilized and are contemplated as falling within the scope of the present invention. According to an exemplary embodiment of the present invention, the carbon nanotube is composed of one or more generally coaxial monoatomic sheets which are cylindrically wrapped about a center axis and have a generally cylindrical type hollow or space defined therein. The carbon nanotube is an extremely slender carbon fibril, having a diameter that is typically measured in nanometers. For example, an exemplary carbon nanotube has a diameter of about 5–50 nanometers or less, however, other size nanotubes may be utilized and are contemplated as falling within the scope of the present invention. In addition, the variation in diameter or cross sectional area between nanotubes of a given batch is extremely small, for example, on the order of about 1–5 Angstroms or less.

The carbon nanotube scanning tip may be fabricated according to any one of a variety of different techniques. For example, the carbon nanotube may be synthesized using an arc-discharge method, wherein a plasma is generated between two graphite electrodes in a vacuum chamber filled with helium. Alternatively, the carbon nanotube may be fabricated via laser ablation, wherein a graphite target mixed with metal catalysts are ablated at high temperature. In yet another alternative technique, the carbon nanotube may be formed using chemical vapor deposition (CVD). Any manner of forming or otherwise growing the carbon nanotube may be utilized and is contemplated as falling within the scope of the present invention.

Figure 3:
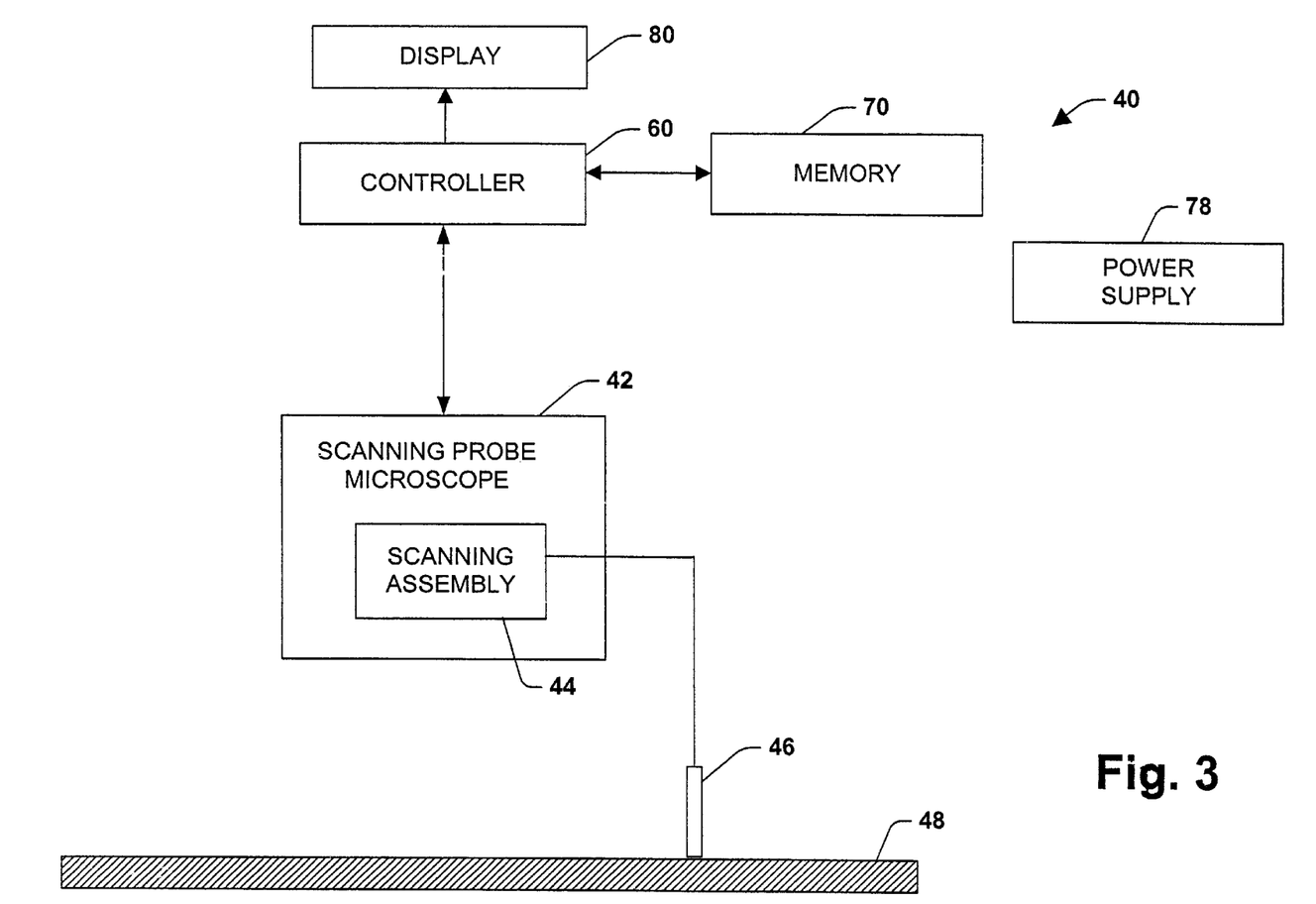
FIG. 3 is a system level diagram illustrating an analysis system comprising a scanning probe microscope employing a nanotube scanning tip according to the present invention.

Referring now to FIG. 3, a system 40 for analyzing a film or feature is shown. According to the present invention, the system 40 is operable to analyze any type artifact of resident on or within a film or substrate, and any such analysis is contemplated as falling within the scope of the present invention. The system 40 includes a scanning probe microscope 42 having a scanning assembly 44 associated therewith. A nanotube scanning tip 46 is coupled to, or alternatively may be considered a portion of, the scanning assembly 44. The nanotube scanning tip 46 either contacts or is located near a substrate or film 48 of interest, depending upon the operational mode of the scanning probe microscope 42. The scanning assembly 44 further includes, for example, a cantilever assembly, position detector, electrical or other sensor(s), etc., which may interface the scanning tip 46 with the scanning probe microscope 42. For example, the nanotube scanning tip 46 may be in contact with or in near contact with the film/substrate 48 via a cantilever beam (not shown) which is associated with the scanning assembly 44. The scanning probe microscope 42, in conjunction with the nanotube scanning tip 46 is operable to scan the film or feature of interest on the substrate 48 and detect a characteristic associated with the nanotube scanning tip 46 (e.g., a topographical change via a cantilever deflection or a tunneling current value).

A controller or processor 60 is operatively coupled to the scanning probe microscope 42, receives the detected characteristic(s) therefrom, and determines a characteristic associated with the film or feature on the substrate 48 based on the detected scanning tip characteristic. In addition, according to an exemplary embodiment of the invention, the controller 60 is programmed to control and operate the various components within the system 40 in order to carry out the various functions described herein. The controller or processor 60 may be any of a plurality of processors, such as the AMD Athlon, K6 or other type architecture processors. The manner in which the controller 60 can be programmed to carry out the functions relating to the present invention will be readily apparent to those having ordinary skill in the art based on the description provided herein.

A memory 70 is also included in the system 20. The memory 70 is operatively coupled to the controller 60 and serves to store program code executed by the controller 60 for carrying out operating functions of the system 40 as described herein. The memory 70 includes, for example, read only memory (ROM) and random access memory (RAM). The ROM contains, among other code, the Basic Input-Output System (BIOS) which controls the basic hardware operations of the system 40. The RAM preferably is the main memory into which the operating system and application programs are loaded. The memory 70 also serves as a storage medium for temporarily storing information such as the detected scanning tip characteristic(s), subsequently determined film/feature characteristic(s) associated therewith, film/substrate coordinate tables, scanning probe microscope information, and other data which may be employed in carrying out the present invention. For mass data storage, the memory 70 may include a hard disk drive (e.g., a 10 Gigabyte hard drive).

A power supply 78 provides operating power to the system 40. Any suitable power supply (e.g., battery, line power) may be employed to carry out the present invention.

As discussed supra, the controller 60 is coupled to the scanning probe microscope 46 which operates the scanning of the nanotube tip 46 across the film/substrate 48. According to exemplary embodiments of the present invention, the scanning probe microscope 42 may be either a scanning tunneling microscope (STM), a scanning force microscope (SFM), or an atomic force microscope (AFM), as may be desired. As is generally well known to those skilled in the art, an STM uses a field emission of electrons from the scanning tip 46. The STM is often used as a maskless lithography tool (but is not limited thereto) to expose a resist. The electrons from the tip 46 pass through the resist down to the substrate to thereby expose the resist. In contrast, SFMs and AFMs are both often used to map or image a surface topography of a sample by scanning the tip 46 over the sample 48. The tip position is controlled by maintaining a constant force of the tip 46 on the sample 48, and the deflection of a cantilever associated with the scanning assembly 44 to which the tip 46 is attached is monitored to map the surface topography of the sample. By employing such scanning probe tools utilizing the nanotube tip 46 of the present invention as the scanning tip, a defect profile or film composition profile may be readily ascertained across the surface of the film/substrate 48, as well as other functions in a high resolution manner despite scanning tip wear.

Figure 4:
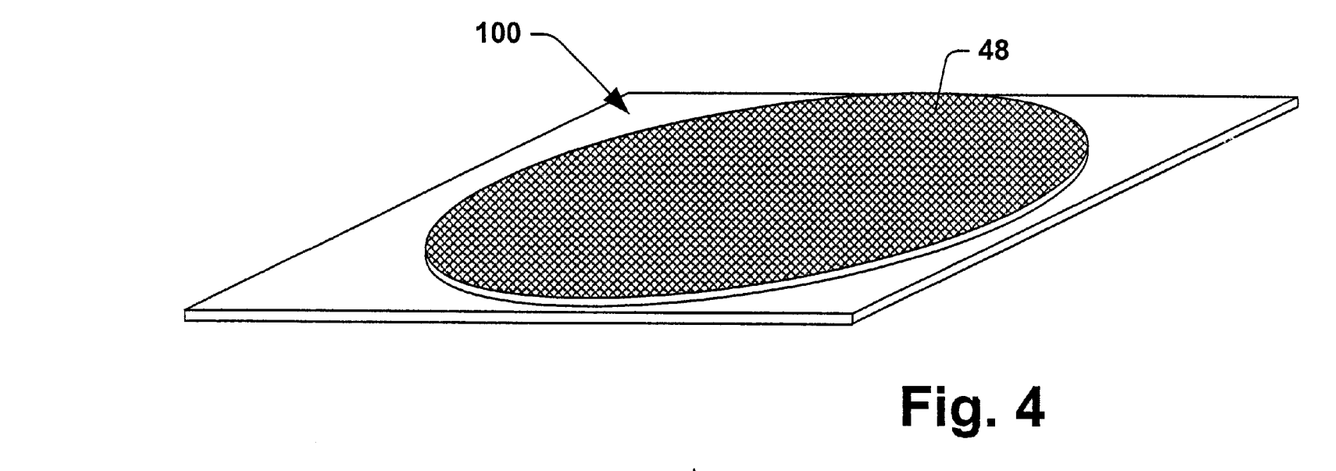
FIG. 4 is a perspective view of a wafer having a film or a feature thereon for analysis using the scanning probe microscope system of the present invention.
Figure 5:
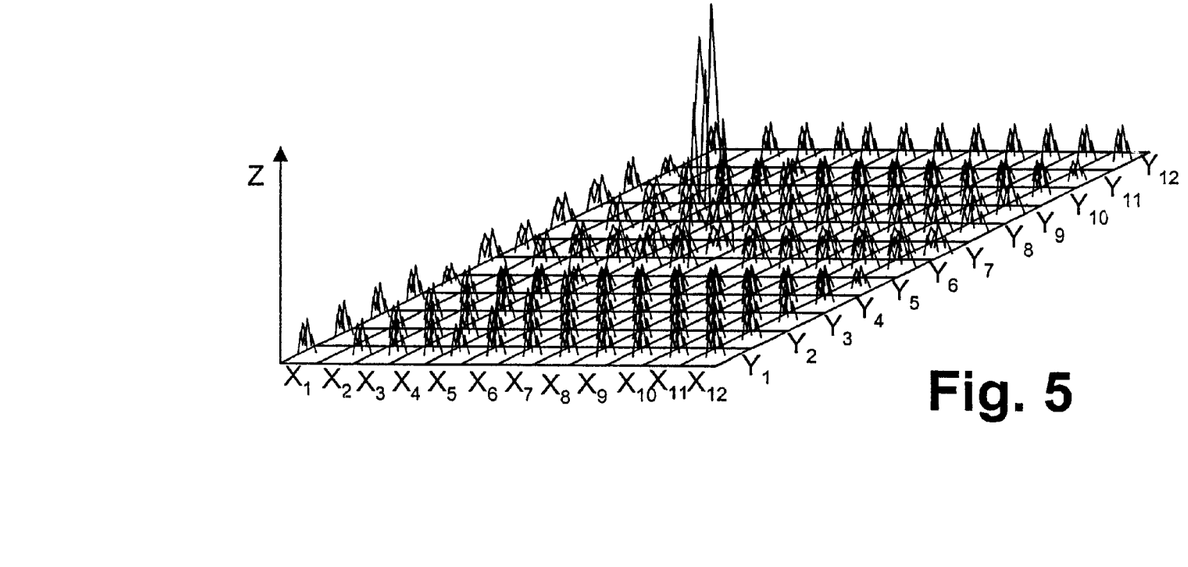
FIG. 5 is a three dimensional graph illustrating a characteristic associated with the film or feature on the substrate of FIG. 4 as detected by the scanning probe microscope system of the present invention.

The system 40 is operable to detect a defect profile or determine a film/substrate composition or topography in the following exemplary fashion, as will be described in conjunction with FIGS. 4–6. According to this example, the nanotube scanning tip 46 employing the nanotube 20 of FIG. 2a, for example, is scanned across the film/substrate 48 in a predetermined manner, as dictated by the controller 60. Accordingly, the film/substrate 48 preferably is mapped by the controller 60 into a grid 100 as illustrated in FIG. 4, wherein each portion of the grid 100 corresponds to an XY position. Depending on the desired system resolution, the number of XY locations on the grid 100 may vary as desired.

When the controller 60 determines that the tip 46 is at location $(X_i, Y_j)$, the controller 60 also controls, for example, the scanning direction and scan rate, as may be desired. At the location $(X_i, Y_j)$, the scanning probe microscope 42 detects a characteristic associated with the nanotube scanning tip 46 thereat and converts the characteristic into one or more electrical signals, for example, analog signals or digital signals which represent the detected characteristic(s), and transmits the detected data to the controller 60. The controller 60 then analyzes the detected scanning tip characteristic according to its programming to determine a characteristic associated with the film/feature of interest at that location. Using such information at multiple locations about the substrate 48, the controller 60 is operable to generate, for example, a topography profile, a defect profile, a conductivity profile, etc., across the plurality of locations $(Z(X_i, Y_j) \ldots Z(X_m, Y_n))$ on the film/substrate 48 as the tip 46 is scanned across the film/substrate surface, as illustrated in FIG. 5.

Figure 6:
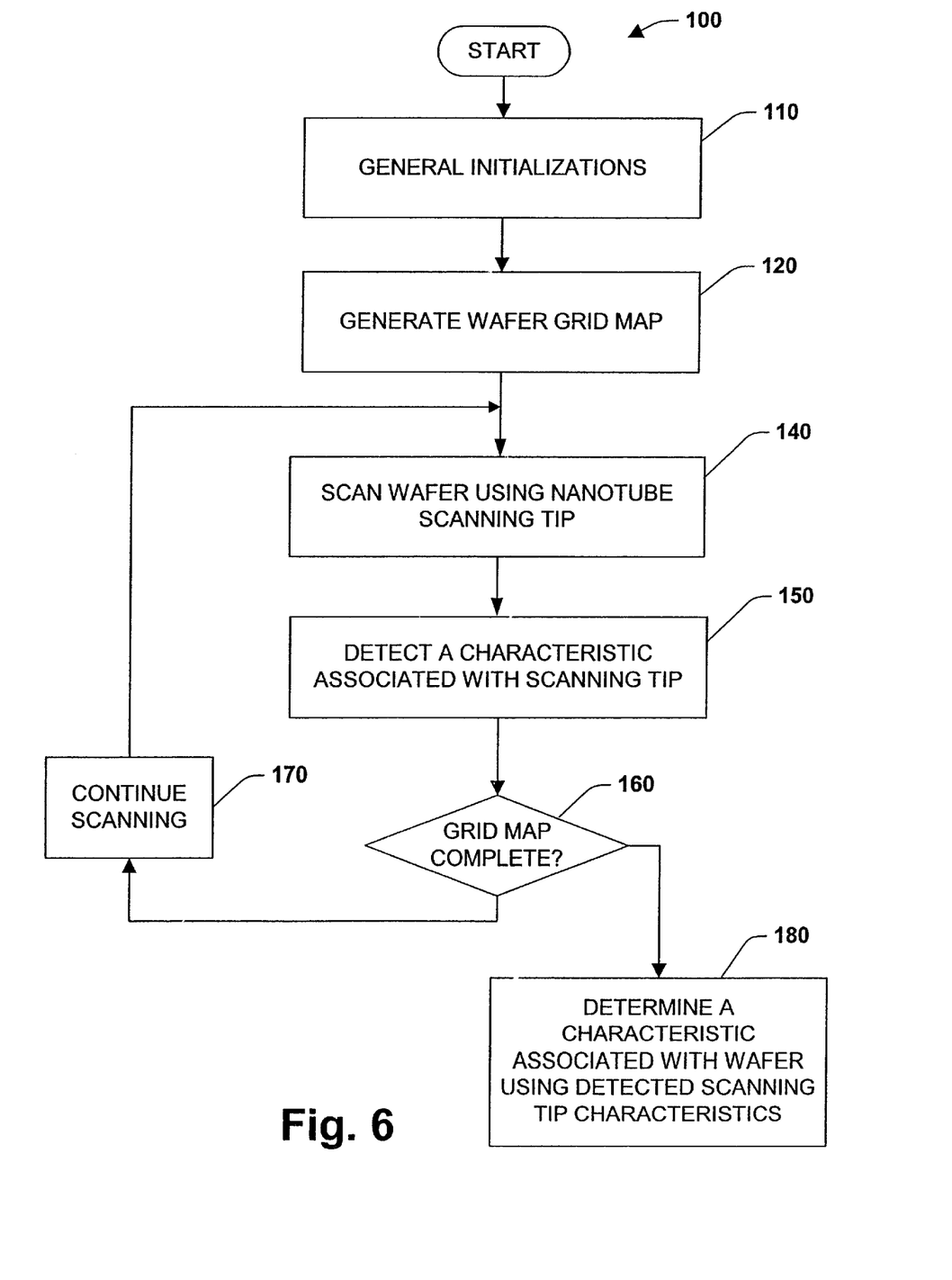
FIG. 6 is a flow chart illustrating a method of analyzing a film or feature on a substrate employing a scanning probe microscope comprising a nanotube scanning tip according to the present invention.

FIG. 6 is a flow chart diagram illustrating one particular methodology 100 for carrying out the present invention. In step 110, the controller or processor 60 performs general initializations to the detection system 40. In step 120, the controller 60 maps at least a portion of the film/substrate 48 into a plurality of grid blocks "XY". In step 140, the nanotube tip 46 is scanned across the surface of the film/substrate 48 and a characteristic of the nanotube tip 46 such as a deflection or tunneling current associated therewith is detected at step 150 by the SPM 42 with respect to the various film/substrate portions mapped by the respective grid blocks XY via the feedback loop identified by steps 160 and 170.

The controller 60 then analyzes the detected scanning tip characteristic data received from the SPM 42 and determines a characteristic associated with the wafer using the detected scanning tip characteristic data at step 180. For example, if the detected scanning tip data is a cantilever deflection, the controller 60 may determine the height dimension of the artifact associated with the deflection (e.g., a feature, a defect or a recess). In addition, the controller 60 may identify the XY coordinate associated with the characteristic and, in conjunction with multiple pieces of data, generate a topographical mapping of the artifact of interest. Similarly, the controller 60 may determine other characteristics of the film/feature of interest at step 180 such as conductivity, charge accumulation, uniformity, etc. The use of a nanotube scanning tip 46 in the method 100 of FIG. 6 provides for improved scanning performance and reduced cost by providing for consistent scanning resolution despite scanning tip wear and allowing a single scanning tip to exhibit a substantially longer useful life than conventional tips.

In addition to the above functionality, the present invention may also be employed to perform highly accurate, precise linewidth and/or feature profile measurements, and the discussion of analyzing the film or substrate above is contemplated as including such functions and operations. As is well known, individual features in semiconductor integrated circuits which make up such circuits are constantly getting smaller. The present invention may be employed in facilitating the characterization of various processes used to make such features by utilizing the above-described system and method in measuring the linewidths and characterizing the profiles of various features. Using scanning nanotube tips facilitates the above process by providing high accuracy measurements that are accurate independent of scanning tip wear. In addition, the nanotube scanning tips are replaced less often and, when replaced, are replaced in a substantially less burdensome manner which does not require re-calibration of the tip.

Use of the nanotube scanning tip described above provides for significant advantages over conventional scanning tips. For example, the nanotube scanning tips provide for a significant improvement in measurement precision over the conventional conical scanning tips. To better appreciate how the nanotube scanning tip of the present invention provides better measurement precision, a brief discussion of the conical scanning tips follows below and will be discussed in conjunction with FIGS. 7a–7d, respectively.

Figure 7A:
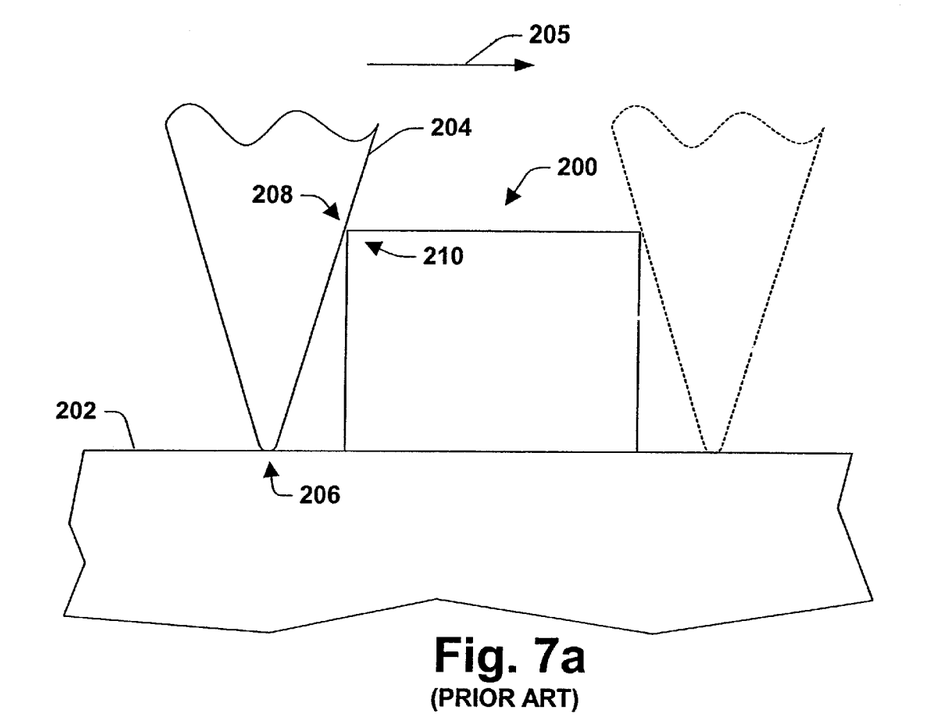
FIGS. 7a–7b are fragmentary cross section diagrams illustrating a conventional conical scanning tip used to analyze or measure a feature on a substrate and further illustrate how the shape of the conical scanning tip results in poor measurement resolution.

In FIG. 7a, a feature 200 resides on a surface 202, for example, a semiconductor substrate. A conventional conical scanning tip 204 associated with an SPM (not shown) scans across the surface 202 in the direction of the arrow 205 to measure the linewidth and/or analyze the profile of the feature 200. Note, however, at a tip position 206 shown in FIG. 7a, that an edge 208 of the scanning tip 200 contacts a corner 210 of the feature 202 and the tip 204 can no longer scan along the surface 202, but instead must ride up against the feature. A similar phenomena occurs on the other side of the feature 200, as shown in the phantom depiction of the scanning tip 204.

Figure 7B:
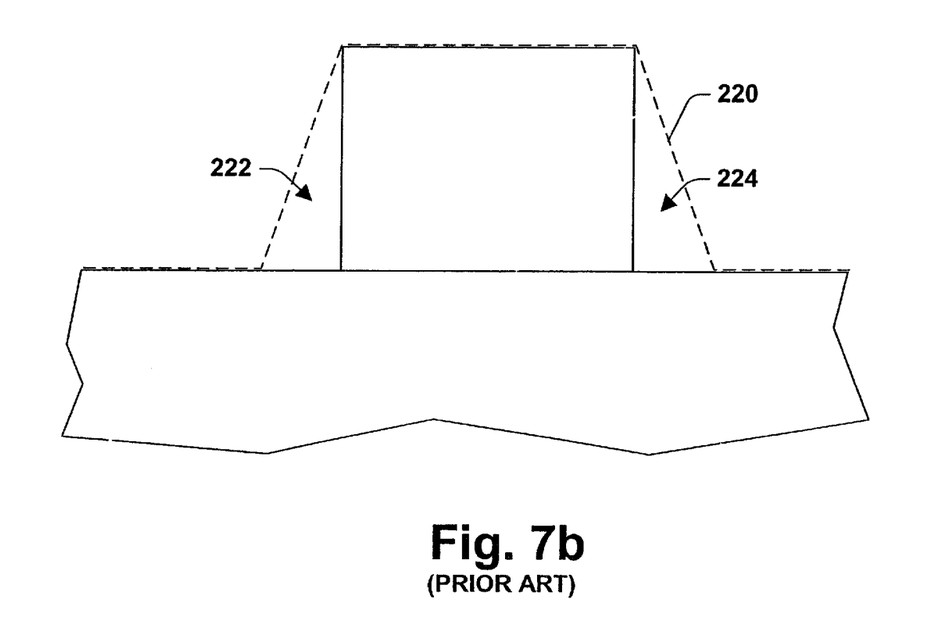

As can be seen from FIG. 7a, due to the conical shape of the scanning tip 204, a significant amount of data relating to the profile of the feature 200 is not collected. Instead the topographical data follows a contour 220, as illustrated in FIG. 7b. Although some assumptions about the feature 200 can be made from the data 220, one does not know for certain the linewidth measurement or profile of the feature in regions 222 and 224, respectively. Since appreciating the side profiles and linewidth measurements at a feature's base is extremely important in some circumstances, the conventional conical scanning tip is not an effective tool in measuring linewidths and analyzing feature profiles with high precision.

Figure 7C:
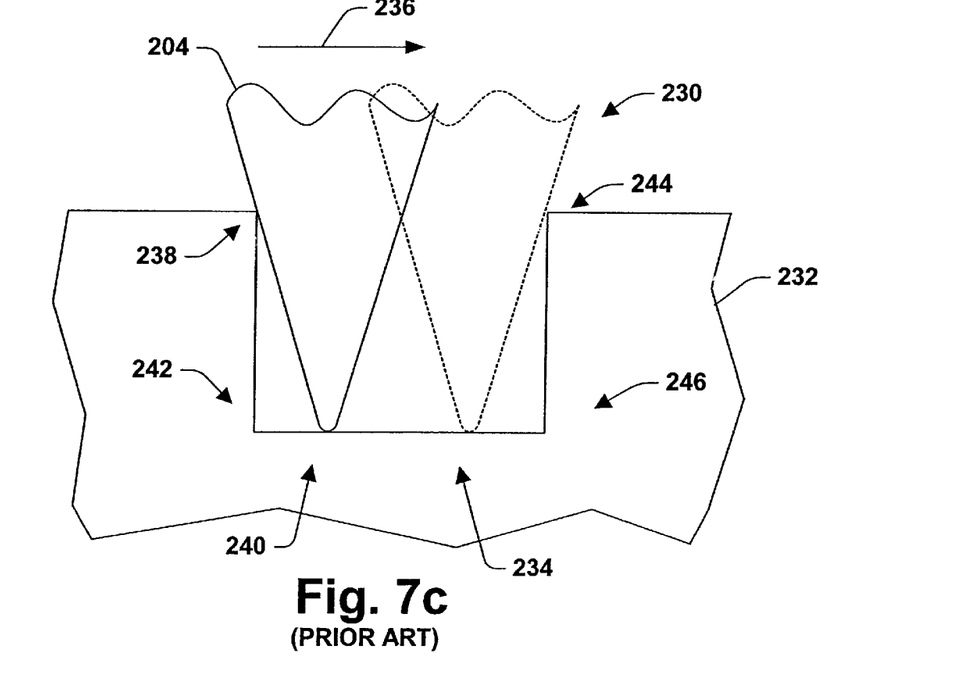
FIGS. 7c–7d are fragmentary cross section diagrams illustrating a conventional conical scanning tip used to analyze or measure a contact hole in a film and further illustrate how the shape of the conical scanning tip results in poor measurement resolution, causing the conventional analysis to be ineffective for determining whether a contact hole is partially closed.

A problem similar to the above discussion also exists when analyzing contact holes. In FIG. 7c, a contact hole 230 resides in a film 232, for example, an insulating layer. The conventional conical scanning tip 204 associated with an SPM (not shown) scans across the surface of the film 232 in the direction of the arrow 236 to measure the dimensions associated with the contact hole 230. In addition to merely measuring the dimensions of the contact hole, it is desirable to determine whether the contact hole is either fully open or only partially open (which is similar to saying partially closed). It is desirable that lithography and etch processes that produce contact holes be able to produce fully open contact holes in a controlled, reproducible manner. To say that a contact hole is "fully open" means that the amount of remaining material (e.g., insulating material) within the contact hole after formation is below a predetermined amount. Therefore if an acceptable contact hole threshold were set at 10%, for example, then a contact hole would be considered "fully open" if the amount of insulating material remaining therein was less than 10% of the entire contact hole (and can be determined as a function of the area of material at the bottom of the contact hole or by volume, as may be desired).

It is desirable to make contact holes fully open in order to reduce the contact resistance associated therewith. As is well known, as contact resistivity increases, power and heat are dissipated thereat undesirably. When the conical scanning tip 204 scans across the region containing the contact hole 230, the tip 204 rides along a corner 238 thereof so that when the tip 204 finally contacts the bottom portion 234 of the contact hole 230, the tip 204 is at a position 240 and data is not collected in a bottom corner 242 of the contact hole. Similarly, as the tip 204 continues to scan, the tip 204 again encounters an opposite corner 244 to reach the top of the contact hole. When the tip 204 contacts the corner 244, data is no longer collected as the bottom 234 of the contact hole, thus resulting in no data collected in the opposite bottom corner 246 of the contact hole. The data that is collected in the contact hole by the conical scanning tip 204 is shown by the contour 250 in FIG. 7d.

Figure 7D:
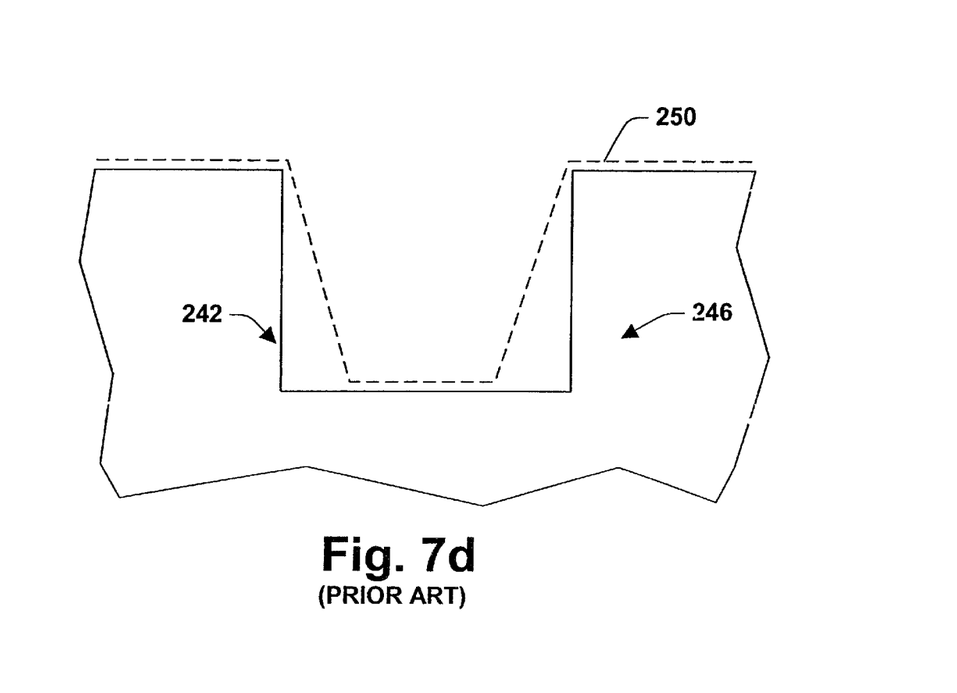

The poor data collection capability of the conventional conical scanning tip 204 in analyzing contact holes, as illustrated in FIGS. 7c–7d, is further exacerbated by the fact that any remaining matter in the contact hole 230 is likely to reside in the corners 242 and 246, respectively. Consequently, in analyzing the data along the contour 250 of FIG. 7d, one cannot accurately determine whether the contact is fully open or only partially open. The nanotube scanning tip of the present invention has dimensions and other physical characteristics that overcome the shortcomings associated with conventional conical scanning tips and provides for accurate linewidth measurement, profile analysis and contact hole analysis, as will be described in greater detail below.

Figure 8A:
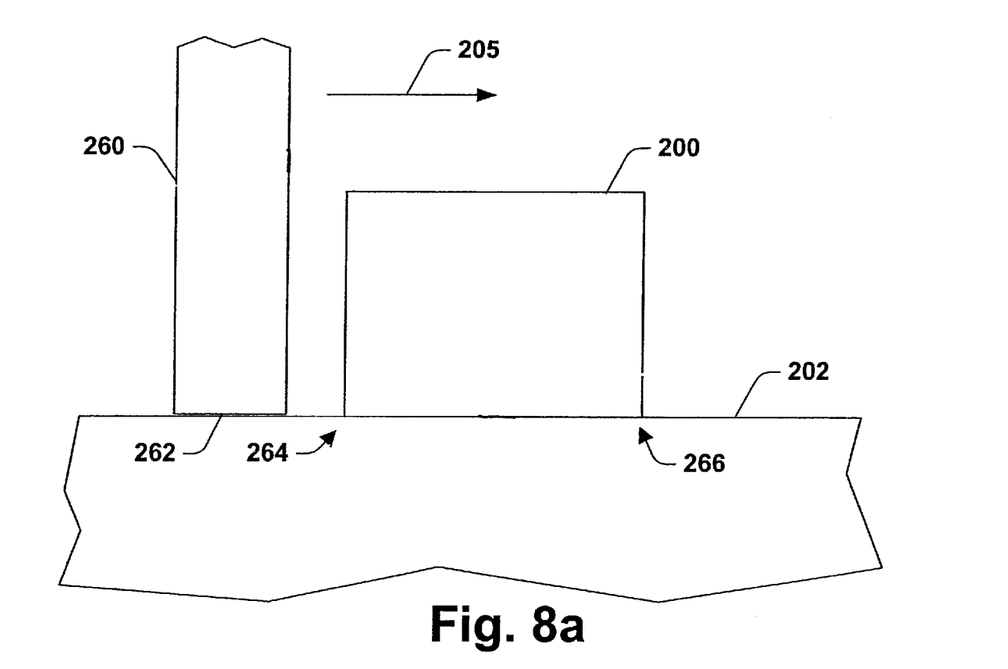
FIGS. 8a–8b are fragmentary cross section diagrams illustrating a nanotube scanning tip used to analyze or measure a feature on a substrate and further illustrate how the nanotube scanning tip results in excellent measurement resolution according to the present invention.
Figure 8B:
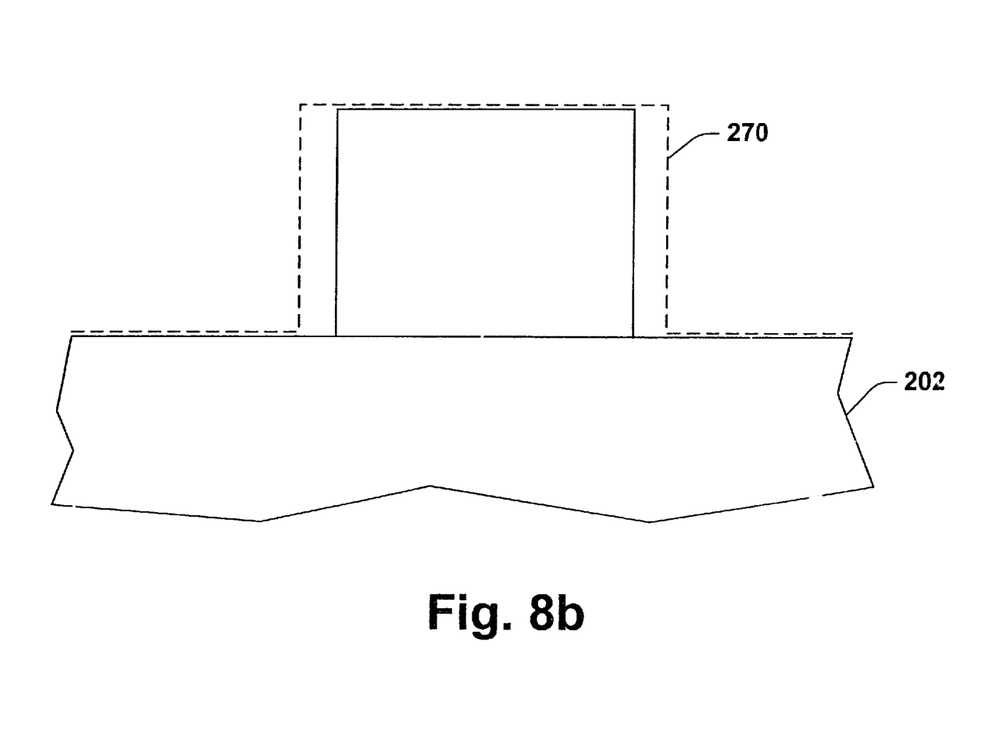

The nanotube scanning tip of the present invention has a diameter or a cross sectional area that is substantially constant along at least a portion of its length. This dimensional characteristic makes the scanning tip ideal for measuring linewidths, analyzing profiles and analyzing contact holes. In FIG. 8a, the feature 200 residing on the surface 202 is scanned by a nanotube scanning tip 260, for example, a carbon nanotube, which is employed within an SPM (not shown) along a direction of the arrow 205. Due to the generally constant diameter or cross section of the nanotube scanning tip 260, once the tip 260 encounters the feature 200, the bottom tip portion 262 is in the corner 264 of the feature/substrate interface and the data associated with the corner 264 is collected. Similarly, as the nanotube scanning tip 260 continues to scan along the direction of arrow 205, the tip 260 passes the feature 200 and returns down to the substrate 202. Due to the dimension of the tip 260, the tip reaches into the opposite corner 266 of the feature/substrate interface and the data associated therewith is collected. Therefore the data collected with the nanotube scanning tip 260 is similar to the contour 270 of FIG. 8b. Note that in stark contrast to the contour 220 of FIG. 7b, data is collected at the corners 264 and 266, respectively, and thus information regarding the linewidth and the profile of the feature can be determined with high precision. Note that the contour 270 shows the actual data collected by the tip 260. However, since the diameter or cross sectional area of the tip 204 is known, a correction factor preferably is used and the data associated with the contour 270 will be substantially closer to each vertical sidewall of the contact hole 230.

Figure 8C:
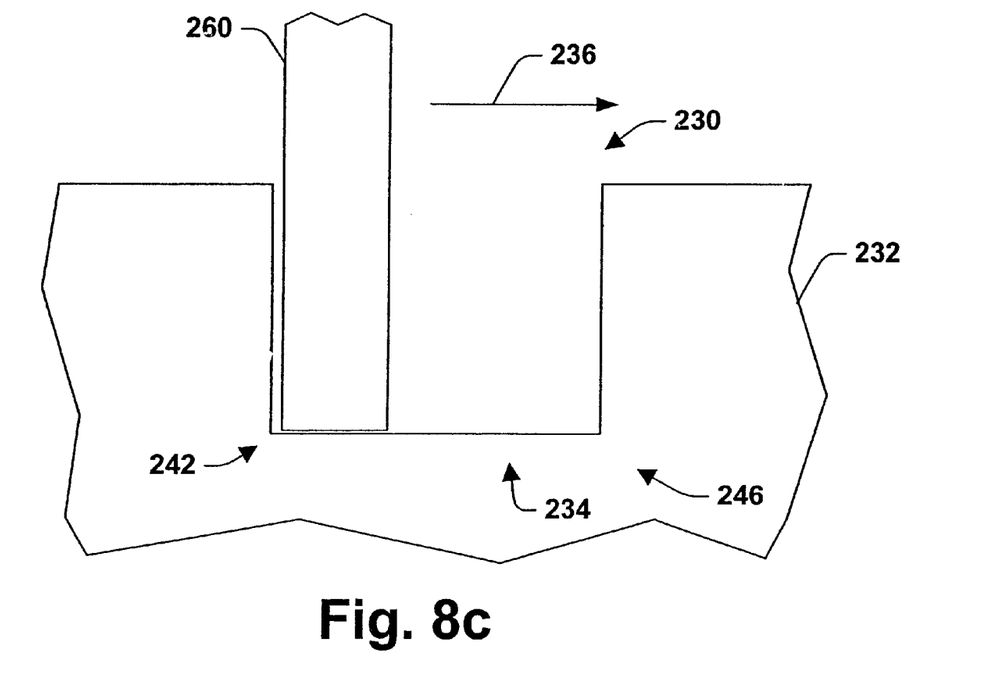
FIGS. 8c–8d are fragmentary cross section diagrams illustrating a nanotube scanning tip used to analyze or measure a contact hole in a film and further illustrate how the nanotube scanning tip results in excellent measurement resolution, causing the analysis to be effective for determining whether a contact hole is partially closed according to the present invention.

In addition, the nanotube scanning tip 260 of the present invention provides for a substantial improvement over conventional methods in determining whether a contact hole is fully open or partially open. Referring to FIG. 8c, as the nanotube scanning tip 260 scans across the contact hole 230 along the direction of arrow 236, the tip 260 transitions from the top surface to the bottom surface 234 of the contact hole at the corner. Due to the dimension of the scanning tip 260, the tip reaches into the bottom corner 242 of the contact hole 230. Similarly, as the tip 260 continues to scan, it reaches into the opposite corner 246. Therefore the data collected from the scan using the nanotube scanning tip 260 follows the contour 272 of FIG. 8d. Note that the contour 272 shows the actual data collected by the tip 260. However, since the diameter or cross sectional area of the tip 260 is known, a correction factor preferably is used and the data associated with the contour 272 will be substantially closer to each vertical sidewall of the feature 200.

Figure 8D:
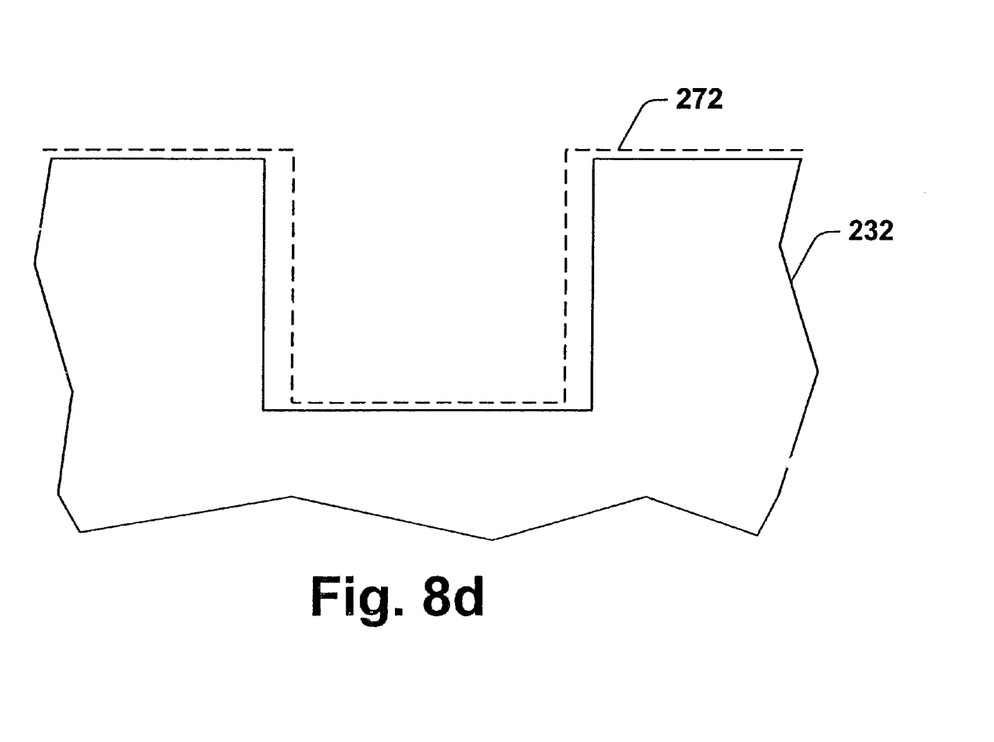

Note that when analyzing the contact hole 230 in FIGS. 8c–8d, the nanotube scanning tip 260 faithfully follows the surfaces of the contact hole 230 with high precision because the diameter or cross sectional area of the tip 260 is generally constant along at least a portion of its length. Consequently, a top or middle portion of the nanotube scanning tip does not interfere with a bottom portion thereof which is interfacing directly with the surface of interest. Therefore use of a nanotube scanning tip 260 allows one to determine effectively whether a contact hole is fully open or partially open.

Figure 9:
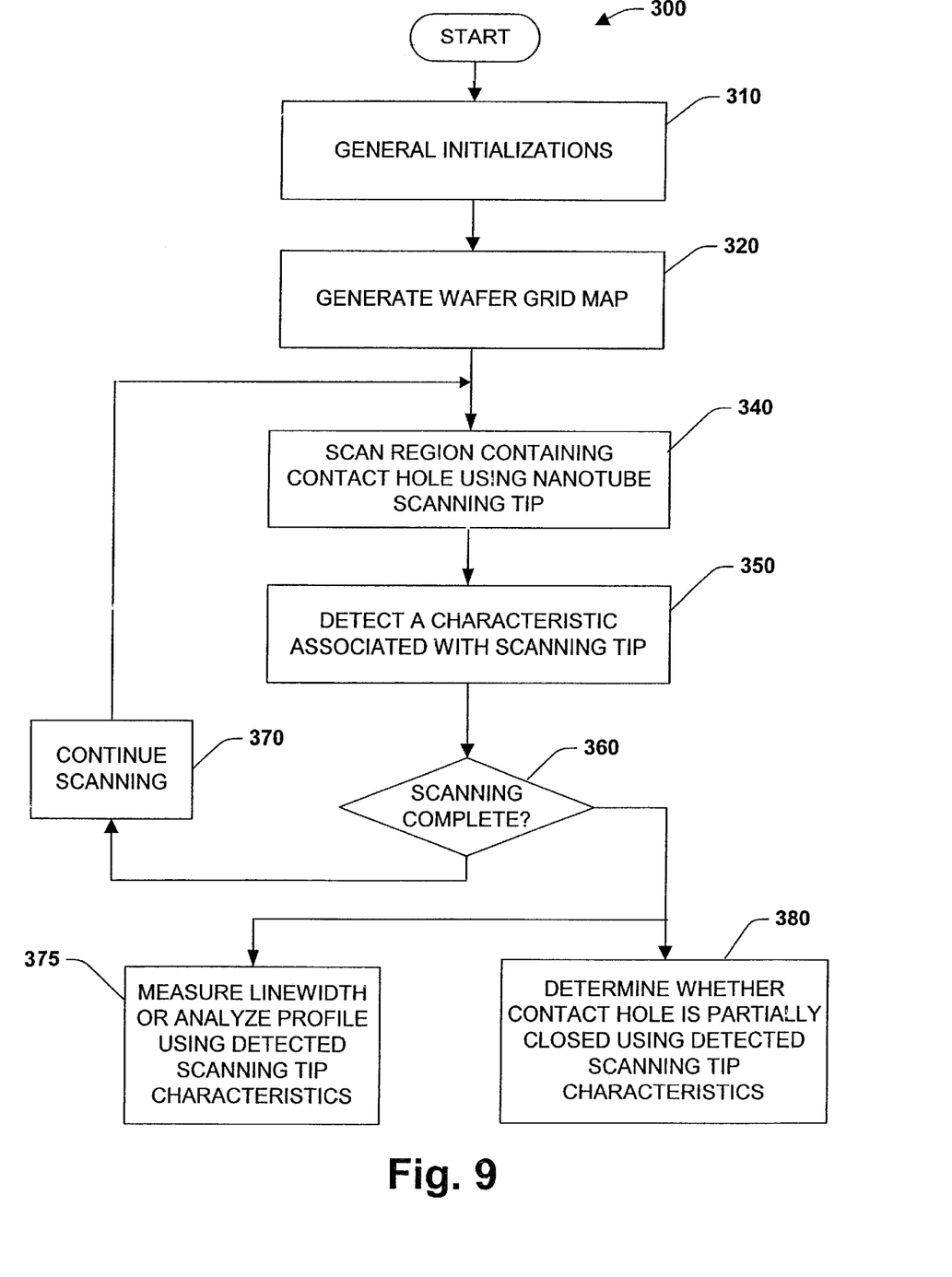
FIG. 9 is a flow chart diagram illustrating a method of detecting a partially closed contact hole using a scanning probe microscope having a nanotube scanning tip according to the present invention.

FIG. 9 is a flow chart diagram illustrating one particular methodology 300 for measuring the linewidth of a feature, analyzing a profile and/or analyzing a contact hole according to the present invention. In step 310, the controller or processor 60 performs general initializations to the detection system 40. In step 320, the controller 60 maps at least a portion of the film/substrate 48 into a plurality of grid blocks "XY". In step 340, the nanotube tip 46 is scanned across the surface of the film/substrate 48 and a characteristic of the nanotube tip 46 such as a deflection or tunneling current associated therewith is detected at step 350 by the SPM 42 with respect to the various film/substrate portions mapped by the respective grid blocks XY via the feedback loop identified by steps 360 and 370.

The controller 60 then analyzes the detected scanning tip characteristic data received from the SPM 42 and determines a characteristic associated with the wafer using the detected scanning tip characteristic data at steps 375 and 380. For example, if the detected scanning tip data is a cantilever deflection, the controller 60 may determine the height dimension of the artifact associated with the deflection (e.g., a feature, a defect or a recess). In addition, the controller 60 may identify the XY coordinate associated with the characteristic and, in conjunction with multiple pieces of data, generate a topographical mapping of the artifact of interest in order to measure the linewidth of a feature or analyze its profile at step 375.

Alternatively, the method 300 may determine whether a contact hole is partially closed at step 380 using such topographical data. For example, by obtaining a topographical mapping of the bottom portion of the contact hole, the controller 60 (according to its internal programming) can calculate the amount of unwanted material remaining therein and compare that amount to a predetermined threshold. In the event that the mapping indicates an amount of unwanted material in the contact hole which exceeds the threshold value, the controller 60 will indicate that the contact hole is partially closed.

The use of a nanotube scanning tip in the method 300 of FIG. 9 provides for improved scanning performance and reduced cost by providing for consistent scanning resolution despite scanning tip wear and providing improved accuracy in measurements of linewidths, features and contacts holes over conventional methods.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i. e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. A method of analyzing a contact hole, comprising the steps of:
   scanning at least a portion of the contact hole with a scanning probe microscope comprising a nanotube scanning tip;
   detecting a characteristic associated with the nanotube scanning tip at a plurality of points during the scanning step; and
   determining a characteristic associated with the portion of the contact hole based on the detected characteristic associated with the nanotube scanning tip.

2. The method of claim 1, wherein detecting the characteristic associated with the nanotube scanning tip comprises detecting a deflection of the nanotube scanning tip from a surface associated with the portion of the contact hole.

3. The method of claim 2, wherein the nanotube scanning tip is in contact with the surface associated with the contact hole and the deflection corresponds to a change in topography of the surface associated with the contact hole.

4. The method of claim 2, wherein the nanotube scanning tip is near the surface associated with the contact hole and the deflection corresponds to a force exerted on the nanotube scanning tip from the surface associated with the contact hole.

5. The method of claim 4, wherein the force comprises one of a magnetic force, an electrostatic force, and a van der Waals force.

6. The method of claim 4, wherein a distance between the nanotube scanning tip and the surface associated with the contact hole is about 5 to about 500 Angstroms.

7. The method of claim 2, herein the nanotube scanning tip is near the surface associated with the contact hole and the deflection corresponds to a tunneling current in the nanotube scanning tip.

8. The method of claim 7, wherein a distance between the nanotube scanning tip and the surface associated with the contact hole is about 5 Angstroms.

9. The method of claim 1, wherein the scanning probe microscope comprises an atomic force microscope or a scanning tunneling microscope.

10. The method of claim 1, wherein determining the characteristic associated with the portion of the contact hole comprises correlating the detected characteristic associated with the nanotube scanning tip to topography data.

11. The method of claim 10, wherein the topography data comprises a vertical dimension value relative to a vertical reference point for each of the plurality of points.

12. The method of claim 11, further comprising using the vertical dimension value and the vertical reference point to determine a contact hole depth for each of the plurality of points.

13. The method of claim 1, further comprising using the determined characteristic associated with the portion of the contact hole to provide a topographical mapping of the contact hole portion.

14. The method of claim 13, wherein the topographical mapping comprises vertical dimension data relative to a vertical reference point as a function of a horizontal position of the, contact hole portion.

15. The method of claim 1, wherein determining the characteristic associated with the portion of the contact hole comprises determining whether the portion of the contact hole is partially or wholly closed.

16. The method of claim 15, wherein determining whether the portion of the contact hole is partially or wholly closed comprises:
   determining a contact hole bottom portion using the detected characteristic associated with the nanotube scanning tip at the plurality of points;
   evaluating a percentage of the contact hole portion associated with the contact hole bottom portion; and
   determining whether the portion of the contact hole is partially or wholly closed based on the percentage.

17. The method of claim 15, wherein determining whether the portion of the contact hole is partially or wholly closed comprises:
   determining a volume of the contact hole portion using the detected characteristic associated with the nanotube scanning tip at the plurality of points;
   comparing the determined volume of the contact hole portion to a predetermined volume threshold; and
   determining whether the portion of the contact hole is partially or wholly open if the determined volume is greater than the predetermined volume threshold.

18. A method of detecting a partially open contact hole, comprising the steps of:
   scanning a region containing the contact hole with a scanning probe microscope comprising a nanotube scanning tip;
   generating topography data associated with the scanning step; and
   determining whether the contact hole is fully open using the topography data.

19. The method of claim 18, wherein determining whether the contact hole is fully open comprises:

generating a metric using the topography data, wherein the metric provides information relating to a percentage of the contact hole which is open;

comparing the metric to a predetermined threshold; and determining whether the contact hole is fully open if the metric is greater than the predetermined threshold.

20. The method of claim 19, wherein the metric relates to a percentage of a bottom portion of the contact hole which does not have foreign material thereon.

21. The method of claim 19, wherein the metric relates to a percentage of an expected volume of the contact hole.

* * * * *